United States Patent
Ha et al.

(10) Patent No.: US 11,809,199 B2
(45) Date of Patent: Nov. 7, 2023

(54) METHOD AND APPARATUS FOR PREDICTING DEMAND FOR PERSONAL MOBILITY VEHICLE AND REDISTRIBUTING PERSONAL MOBILITY VEHICLE

(71) Applicants: Hyundai Motor Company, Seoul (KR); Kia Corporation, Seoul (KR); Kookmin Univeristy Industry Academy Cooporation Foundation, Seoul (KR)

(72) Inventors: Jae Jun Ha, Hwaseong-si (KR); Gu Min Jeong, Seoul (KR); Hyun Jung Oh, Seoul (KR); Seung Hyeon Lee, Seoul (KR)

(73) Assignees: Hyundai Motor Company, Seoul (KR); Kia Corporation, Seoul (KR); Kookmin University Industry Academy Cooperation Foundation, Seoul (KR)

( * ) Notice: Subject to any disclaimer, the term of this patent is extended or adjusted under 35 U.S.C. 154(b) by 131 days.

(21) Appl. No.: 17/407,595

(22) Filed: Aug. 20, 2021

(65) Prior Publication Data
US 2022/0057809 A1    Feb. 24, 2022

(30) Foreign Application Priority Data

Aug. 24, 2020 (KR) .................. 10-2020-0106536
Apr. 23, 2021 (KR) .................. 10-2021-0052734

(51) Int. Cl.
G05D 1/02 (2020.01)
G01S 19/10 (2010.01)

(52) U.S. Cl.
CPC ............ *G05D 1/0287* (2013.01); *G01S 19/10* (2013.01); *G05D 1/0212* (2013.01)

(58) Field of Classification Search
CPC ..... G05D 1/0287; G05D 1/0212; G01S 19/10
See application file for complete search history.

(56) References Cited

U.S. PATENT DOCUMENTS

| | | | |
|---|---|---|---|
| 6,317,720 B1* | 11/2001 | Murakami | G06Q 10/02 705/13 |
| 11,541,843 B1* | 1/2023 | Stoffel | B60R 25/002 |
| 2018/0137593 A1* | 5/2018 | Djuric | G06Q 50/30 |
| 2020/0126428 A1* | 4/2020 | Tonosaki | G06Q 50/30 |
| 2021/0005085 A1* | 1/2021 | Cheng | G08G 1/0141 |

* cited by examiner

*Primary Examiner* — Kenneth J Malkowski
*Assistant Examiner* — Carville Albert Hollingsworth, IV
(74) *Attorney, Agent, or Firm* — Slater Matsil, LLP

(57) ABSTRACT

A method of operating an apparatus for predicting and redistributing a personal mobility vehicle (PM vehicle) demand for shared PM vehicles includes generating demand information for the PM vehicles for a plurality of areas according to time, generating current distribution information for the PM vehicles positioned in the plurality of areas, generating target distribution information based on the demand information and the current distribution information, and redistributing the PM vehicles according to the target distribution information.

20 Claims, 7 Drawing Sheets

METHOD AND APPARATUS FOR PREDICTING DEMAND FOR PERSONAL MOBILITY VEHICLE AND REDISTRIBUTING PERSONAL MOBILITY VEHICLE

CROSS-REFERENCE TO RELATED APPLICATIONS

This application claims the benefit of Korean Patent Application Number 10-2020-0106536, filed on Aug. 24, 2020, and Korean Patent Application Number 10-2021-0052734, filed on Apr. 23, 2021, which applications are hereby incorporated herein by reference.

TECHNICAL FIELD

Embodiments of the present disclosure relate to an apparatus and method for predicting and redistributing a personal mobility vehicle (PM vehicle) demand.

BACKGROUND

The contents described in this section merely provide background information for the present disclosure and do not constitute the related art.

Recently, as a moving means or a transportation means, the proportion of vehicles is decreasing, and the proportion of personal mobility vehicles (PM vehicles) is gradually increasing. Here, the PM vehicle is a moving object and means a moving means including an electric kickboard, a bicycle, a bike, a smart car, a vehicle, a purpose-built vehicle (PBV), an air vehicle, and the like.

As the number of users using PM vehicles increases and types of PM vehicles become more diverse, the number of users using PM vehicle sharing services who rent and use the PM vehicles for a certain period is increasing. Even when users do not own PM vehicles, the PM vehicles may be used when necessary, and thus the users may conveniently use the PM vehicles.

A PM vehicle sharing method is divided into a dock type and a dock-less type. A dock type sharing service means a method in which a user rents or returns a PM vehicle at a pre-designated location. On the other hand, a dock-less type sharing service means a method in which a user rents or returns a PM vehicle at any location.

In the case of the dock type sharing service, when there is no idle PM vehicle which is parking at a designated location, users have inconveniences of having to find other locations where the idle PM vehicle exists. These inconveniences are because the amount of PM vehicles used by users varies according to an area or time. That is, there is a phenomenon in which the amount of PM vehicles used is biased for each time and area mainly due to life patterns of users. For example, when PM vehicles gather in public transportation areas such as subway stations or bus stops during rush hour, the number of PM vehicles becomes insufficient in residential areas. Due to these problems, there is a problem in that people have to move to a PM vehicle location far away from their houses in order to use the PM vehicle.

Therefore, in order to smoothly provide the PM vehicle sharing service, it is necessary to redistribute PM vehicles. That is, in providing the PM vehicle sharing service, there is a need for a method for preventing PM vehicles from being too concentrated and for easily managing the PM vehicles.

In particular, in predicting and redistributing a PM vehicle demand, when a global navigation satellite system (GNSS) is used, satellite signal errors may cause problems in positioning accuracy of PM vehicles. For example, when the PM vehicle demand is predicted through the GNSS positioning, it may be predicted that PM vehicles are used a great deal in an area where the PM vehicles are less used.

Therefore, in predicting and redistributing the PM vehicle demand, it is necessary to identify the accurate location of the PM vehicles and predict and redistribute the PM vehicle demand accordingly.

SUMMARY

Embodiments of the present disclosure relate to an apparatus and method for predicting and redistributing a personal mobility vehicle (PM vehicle) demand. Particular embodiments relate to an apparatus and method for predicting and redistributing a PM vehicle demand for accurately identifying positions of PM vehicles through communication, and analyzing usage patterns of PM vehicle users for each area and time.

At least one embodiment of the present disclosure provides a method of operating an apparatus for predicting and redistributing a personal mobility vehicle (PM vehicle) demand for shared PM vehicles, comprising generating demand information for PM vehicles for a plurality of areas according to time, generating current distribution information for the plurality of PM vehicles positioned in the plurality of areas, generating target distribution information based on the demand information and the current distribution information, and redistributing the plurality of PM vehicles according to the target distribution information.

Another embodiment of the present disclosure provides an apparatus for predicting and redistributing a personal mobility vehicle (PM vehicle) demand for shared PM vehicles, comprising a demand information generation unit configured to generate demand information for PM vehicles for a plurality of areas according to time, a current distribution information generation unit configured to generate current distribution information for the plurality of PM vehicles positioned in the plurality of areas, a target distribution information generation unit configured to generate target distribution information based on the demand information and the current distribution information, and a redistribution unit configured to redistribute the plurality of PM vehicles according to the target distribution information.

DETAILED DESCRIPTION OF ILLUSTRATIVE EMBODIMENTS

Figure 1:
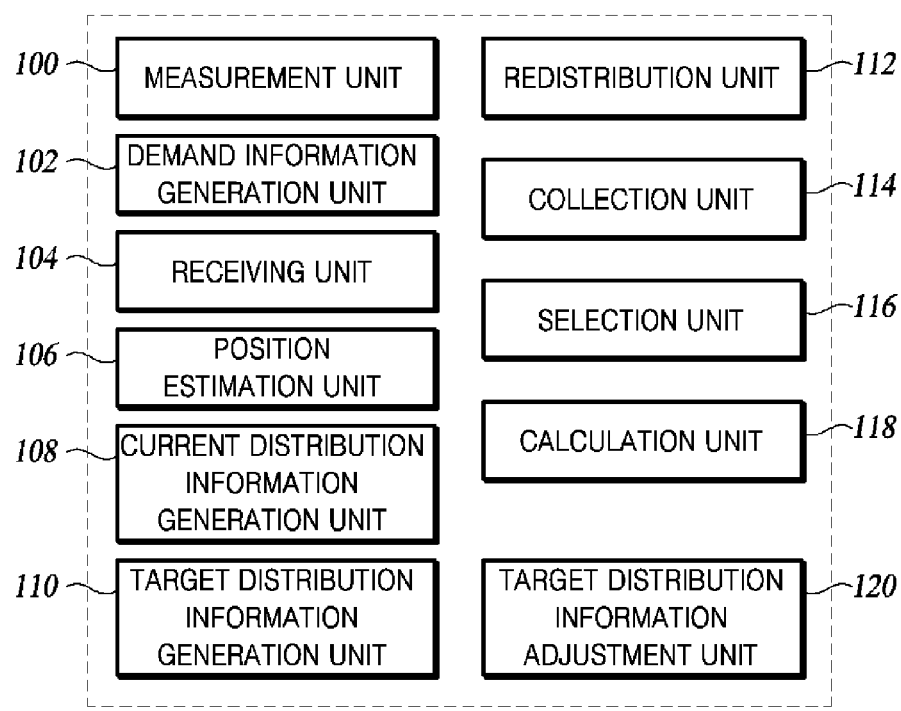
FIG. 1 is a configuration diagram of a personal mobility vehicle (PM vehicle) management server according to an embodiment of the present disclosure.

Embodiments of the present disclosure provide an apparatus and method for predicting and redistributing a PM vehicle demand for increasing convenience of a user using a PM vehicle sharing service by analyzing a usage pattern of the user for PM vehicles arranged in a plurality of areas to predict the demand amount of the PM vehicles for each area and time and redistributing the PM vehicles depending on the predicted demand amount.

Other embodiments of the present disclosure provide an apparatus for predicting and redistributing a PM vehicle demand for preventing a PM vehicle bias phenomenon for each area and time by analyzing a usage pattern of a PM vehicle user in various ways and predicting the PM vehicle demand, and an operation method thereof.

Other embodiments of the present disclosure provide an apparatus for predicting and redistributing a PM vehicle demand capable of accurately predicting and distributing a demand by accurately identifying a position of the PM vehicle through a plurality of road side units and communication even in a global navigation satellite system (GNSS) dead-zone or an area where diffuse reflection of a satellite signal is severe, and an operation method thereof.

Hereinafter, some embodiments of the present disclosure will be described with reference to the exemplary drawings. It is to be noted that in giving reference numerals to components of the accompanying drawings, the same components will be denoted by the same reference numerals even when the components are illustrated in different drawings. In describing embodiments of the present disclosure, when it is determined that a detailed description of related known functions or configurations may obscure the subject matter of the present disclosure, the detailed description thereof will be omitted.

In addition, in describing the components of embodiments of the present disclosure, terms such as first, second, A, B, (a), (b), etc. may be used. These terms are used only in order to distinguish any component from other components, and features, sequences, or the like, of corresponding components are not limited by these terms. Throughout the present specification, unless explicitly described to the contrary, "including" and "comprising" any components will be understood to imply the inclusion of other elements rather than the exclusion of any other elements. A term such as "part," "module," or the like described in the specification means a unit of processing at least one function or operation and may be implemented as hardware or software or a combination of hardware and software.

Hereinafter, a personal mobility vehicle (hereinafter referred to as a PM vehicle) includes a moving object. Examples of the PM vehicle include a micro mobility vehicle, an electric bicycle, an electric kickboard, an electric scooter, an electric wheelchair, an electric bike, a Segway, a 2-wheel drive vehicle, a smart car, a shuttle, a personal moving means, a personal flying means, a smart mobility vehicle, a shared mobility vehicle, first mile vehicle, last mile vehicle, a Purpose Built Vehicle (PBV), a personal air vehicle (PAV), a vehicle, an electric vehicle, or the like.

In addition, all road side units (RSUs) perform broadcasting but may support communication methods such as unicast and multicast, if necessary. Hereinafter, the RSUs are described on the basis of performing vehicle to everything (V2X) communication with a personal mobility vehicle (PM vehicle) but are not limited thereto, and LTE-V2X, C-V2X, 5G-V2X, wireless access in vehicular environment (WAVE), dedicated short range communication (DSRC), or the like may be used. That is, communication protocols used in an intelligent transport system (ITS) may be used.

An apparatus for predicting and redistributing a PM vehicle demand is preferably implemented as a server positioned outside the PM vehicle but is not limited thereto and may be implemented as a RSU, a base station, or the like. Hereinafter, the apparatus for predicting and redistributing a PM vehicle demand is referred to as a PM vehicle management server. The PM vehicle management server may store, in advance, at least one of a virtual map, identification information of the RSU, position coordinates corresponding to the identification information of the RSU, identification information of the PM vehicle, and subscriber information of a user. Here, the position coordinates mean a latitude and a longitude or mean two-dimensional or three-dimensional coordinates based on a specific point.

FIG. 1 is a configuration diagram of a PM vehicle management server according to an embodiment of the present disclosure.

Referring to FIG. 1, a PM vehicle management server 10 includes at least one of a measurement unit too, a demand information generation unit 102, a receiving unit 104, a position estimation unit 106, a current distribution information generation unit 108, a target distribution information generation unit 110, a redistribution unit 112, a collection unit 114, a selection unit 116, a calculation unit 118, or a target distribution information adjustment unit 120.

The measurement unit 100 is a component which measures a change in position of the PM vehicle and a time of the change in the position of the PM vehicle for the plurality of areas. When the position of the PM vehicle estimated by the position estimation unit 106 moves more than a preset distance, the measurement unit 100 measures a distance and time that the PM vehicle moves. The PM vehicle management server 10 may determine that the PM vehicle is used at the time when the position of the PM vehicle changes.

The demand information generation unit 102 is a component that generates information on a PM vehicle demand for a plurality of areas according to time. Specifically, the demand information generation unit 102 may generate demand information for a plurality of areas according to at least one of a minute, an hour, a day, and a month based on the change in the position of the PM vehicle and the time of the change in the position of the PM vehicle. That is, the demand information means a PM vehicle demand amount predicted for a specific time or a specific period.

The demand information generation unit 102 may generate target distribution information using deep learning. For supervised learning, the demand information generation unit 102 generates an area and a time as training data and generates current distribution information as correct answer data. When the demand information generation unit 102 inputs the area and time to a neural network, the neural network outputs expected distribution information according to the area and time. The demand information generation unit 102 may adjust a parameter or a loss function of the neural network so that the neural network outputs current distribution information that is the correct answer data.

The receiving unit 104 is a component that receives, from a plurality of PM vehicles, messages that the plurality of PM vehicles receive from a plurality of RSUs. Specifically, the receiving unit 104 may receive, from a PM vehicle, the messages that the PM vehicle receives from at least three RSUs. The messages are used to estimate the position of the PM vehicle by the position estimation unit 106.

The position estimation unit 106 is a component that estimates the positions of the plurality of PM vehicles based on the messages and the position coordinates pre-stored for the plurality of RSUs. Specifically, the position estimation unit 106 may calculate at least one of a received signal strength indicator (RSSI), a round trip time (RTT), a time of flight (ToF), a time of arrival (ToA), or a time difference of arrival (TDoA) of the message. The position estimation unit 106 may measure a distance between the RSU and the PM vehicle based on at least one of the RSSI, RTT, ToF, ToA, or TDoA of the message. The position estimation unit 106 may estimate the position of the PM vehicle by applying triangulation to the distance between at least three RSUs and the PM vehicle.

The position estimation unit 106 according to the embodiment of the present disclosure may accurately estimate the position of the PM vehicle by correcting the position of the PM vehicle using the reference RSU. This will be described below in detail with reference to FIG. 4.

The current distribution information generation unit 108 is a component that generates current distribution information for a plurality of PM vehicles positioned in a plurality of areas. The current distribution information includes real-time distribution information as well as distribution information within a time range from the present. The current distribution information generation unit 108 may generate the current distribution information for the plurality of PM vehicles in the plurality of areas based on the positions of the plurality of PM vehicles. Additionally, the current distribution information generation unit 108 may periodically update the current distribution information of the PM vehicle. For example, the current distribution information generation unit 108 may update the current distribution information whenever the change in the position of the PM vehicle is detected or may update the current distribution information at a predetermined time.

The target distribution information generation unit no is a component that generates target distribution information based on the demand information and the current distribution information. The target distribution information generation unit no may generate excess information or shortage information of the PM vehicle depending on a difference between the demand information and the current distribution information for the plurality of areas. An operation of generating the target distribution information will be described in detail with reference to FIG. 3.

The redistribution unit 112 is a component that redistributes a plurality of PM vehicles according to the target distribution information. Specifically, the redistribution unit 112 moves the PM vehicle from an area in which a first PM vehicle quantity is greater than a first target distribution quantity to an area in which a second PM vehicle quantity is less than a second target distribution quantity based on the excess information or the shortage information of the PM vehicle.

When an administrator is positioned near a PM vehicle to be redistributed, the redistribution unit 112 may request the administrator to redistribute the PM vehicle. In addition, the redistribution unit 112 may control PM vehicles to redistribute the PM vehicles themselves by using an autonomous driving function of the PM vehicles.

The collection unit 114 is a component that collects information about people approaching locations adjacent to a plurality of areas from a public transportation server. Here, the public transportation server is a server capable of collecting population information using a bus or subway, and collecting information on a traffic flow of vehicles or a movement flow of various mobilities. When locations such as a subway station or a bus stop are adjacent to each area, the collection unit 114 may collect the information about people approaching the subway station or the bus stop from the public transportation server.

The collection unit 114 according to another embodiment of the present disclosure may collect event-related information including an event date and time, an event location, and the number of visitors to an event on the network. The collection unit 114 may collect the event-related information through crawling on the network or may directly receive input from an administrator.

The collection unit 114 according to another embodiment of the present disclosure may collect a PM vehicle usage record of a user and age information of the user for a plurality of areas. When the user uses the PM vehicle through his/her own terminal, the collection unit 114 may collect the PM vehicle usage record of the user from a user terminal. Here, the PM vehicle usage record may include at least one of identification information of the PM vehicle, a usage time of the PM vehicle, a position of the PM vehicle, and user terminal information. In addition, the collection unit 114 may collect subscriber information including the age information of the user from the terminal or store the subscriber information in advance.

When the collection unit 114 collects the event-related information, the selection unit 116 is a component that selects an area closer than a preset distance from the event location among the plurality of areas. According to another embodiment of the present disclosure, the selection unit 116 may select several areas closer than the preset distance from the event location. In this case, the closer the distance, the further upward the target distribution information of the areas may be adjusted.

When the collection unit 114 collects the PM vehicle usage record and the age information, the calculation unit 118 is a component that calculates the PM vehicle usage rate by age of the user for the plurality of areas based on the PM vehicle usage record and the age information. In this case, the lower the age group that mainly uses PM vehicles, the further upward the target distribution information of the areas may be adjusted.

The target distribution information adjustment unit 120 is a component that adjusts the target distribution information by applying a weight according to the information collected by the collection unit 114 to the target distribution information for the plurality of areas. The target distribution information adjustment unit 120 may adjust a PM vehicle target quantity for the area upward as the number of people approaching locations adjacent to the area increases.

When the selection unit 116 selects an area close to the event location, the target distribution information adjustment unit 120 may adjust the target distribution information by applying a weight to the target distribution information for the selected area. The target distribution information adjustment unit 120 may adjust the PM vehicle target quantity upward as an area becomes closer to the event location.

The target distribution information adjustment unit 120 may adjust the target distribution information by applying a weight to the PM vehicle target quantity as the age having the highest PM vehicle usage rate for the plurality of areas becomes lower. The target distribution information adjustment unit 120 may adjust the target distribution information of the areas upward as an age that uses the PM vehicle the most becomes lower.

Hereinafter, an operation of generating current distribution information of PM vehicles using both radio frequency identification (RFID) and communication will be described.

When RF readers positioned in a plurality of areas read RF signals of RFID tags mounted on a plurality of PM vehicles, the receiving unit 104 receives the RF signals from the RF readers and receives, from the plurality of PM vehicles, global navigation satellite system (GNSS) signals received by the plurality of PM vehicles.

The position estimation unit 106 estimates the positions of the RF readers as the positions of the plurality of PM vehicles based on the RF signals and estimates the positions of the plurality of PM vehicles based on the GNSS signals. In this case, in the case of the PM vehicle in which both the position of the PM vehicle estimated based on the position of the RF reader and the PM vehicle position estimated based on the GNSS signal are known, the position of the PM vehicle estimated based on the position of the RF reader may have a high priority. That is, the position of the PM vehicle is estimated according to the position of the RF reader, and the position of the PM vehicle is estimated based on the satellite signal for the PM vehicle whose position may not be estimated according to the position of the RF reader. On the other hand, the position of the PM vehicle estimated based on the satellite signal may have a high priority.

The position estimation unit 106 according to the embodiment of the present disclosure may estimate the positions of the plurality of PM vehicles using at least one of the RF signal, the satellite signal, and the message. By giving priority to the RF signal, the satellite signal, and the message, the position of the PM vehicle may be estimated according to a signal having a high priority. In addition, in the case of a PM vehicle having none of the three signals, the position of the PM vehicle may be estimated by giving priority to the remaining signals.

For the PM vehicles close to the RF readers, since the position estimation unit 106 uses position coordinates of the RF reader whose accurate position is known, the positions of the PM vehicles may be accurately estimated.

The current distribution information generation unit 108 generates the current distribution information for the plurality of areas based on the positions of the plurality of PM vehicles.

Figure 2A:
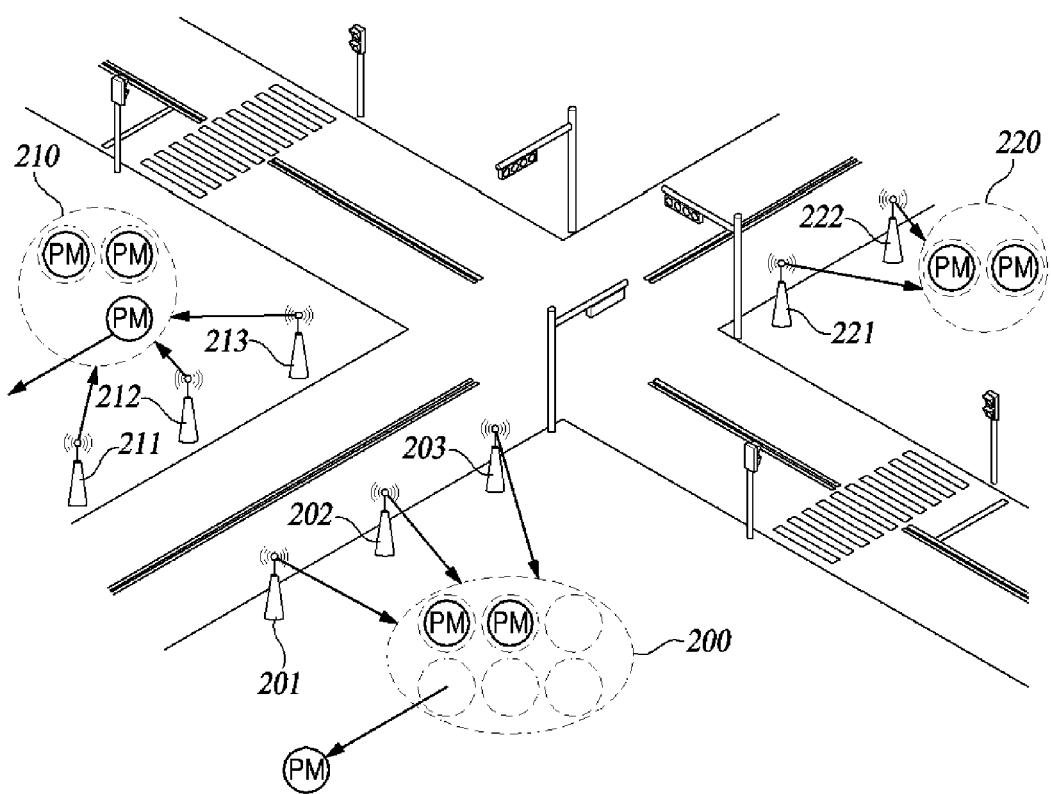
FIGS. 2A and 2B are diagrams for describing an operation of predicting and redistributing a PM vehicle demand according to an embodiment of the present disclosure.
Figure 2B:
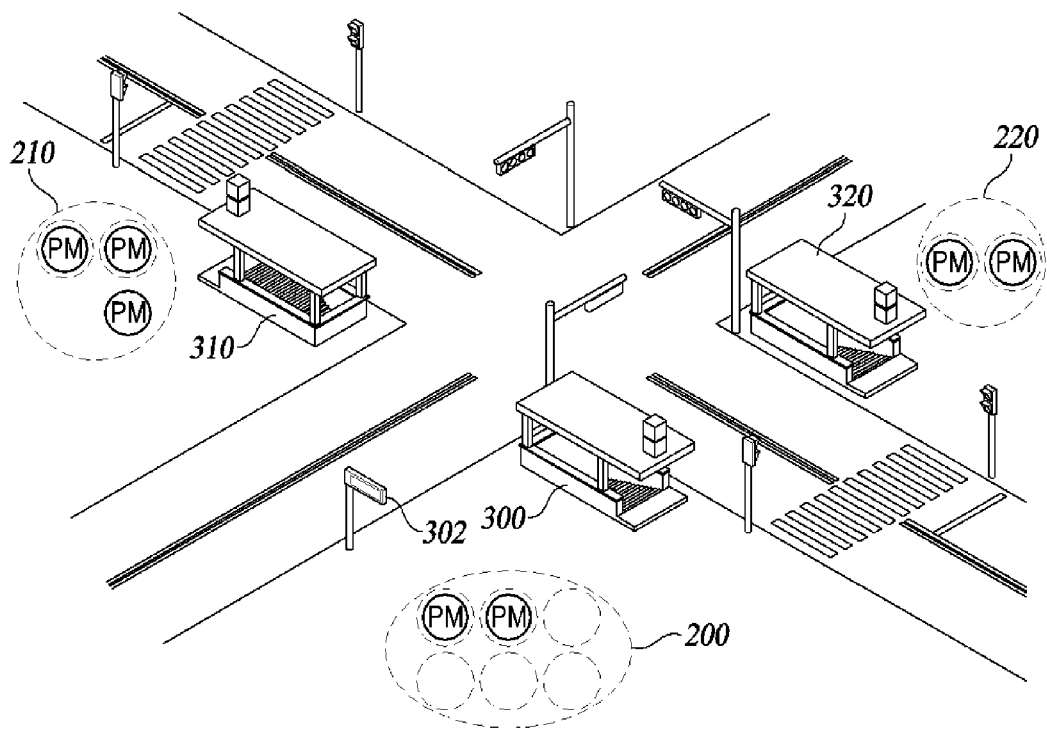

FIGS. 2A and 2B are diagrams for describing an operation of predicting and redistributing a PM vehicle demand according to an embodiment of the present disclosure.

Referring to FIG. 2A, a plurality of areas 200, 210, 220 and a plurality of RSUs 201, 202, 203, 211, 212, 213, 221, and 222 are illustrated. The plurality of areas are referred to as a first area 200, a second area 210, and a third area 220. The plurality of RSUs are referred to as a plurality of first RSUs 201, 202, and 203, a plurality of second RSUs 211, 212, and 213, and a plurality of third RSUs 221 and 222.

The PM vehicle management server (not illustrated) may pre-store at least one of identification information of the plurality of RSUs 201, 202, 203, 211, 212, 213, 221, and 222, position coordinates corresponding to the identification information, identification information of the PM vehicle, or subscriber information of a user.

Hereinafter, the operation of the PM vehicle management server will be described with reference to the first area 200, but the same may be applied to the second area 210 and the third area 220.

Referring to FIG. 2A, the PM vehicle management server receives, from PM vehicles positioned in the first area 200, the messages that the PM vehicles receive from the plurality of first RSUs 201, 202, and 203. It is possible to measure, from the message, the distances between each PM vehicle and a plurality of first RSUs 201, 202, and 203. The PM vehicle management server may estimate the positions of the PM vehicles by applying triangulation to the distances between each PM vehicle and the plurality of first RSUs 201, 202, and 203 and the position coordinates for the plurality of first RSUs 201, 202, and 203.

The PM vehicle management server checks whether the PM vehicle leaves the first area 200 by measuring the change of the positions and the time of the PM vehicles positioned in the first area 200.

The PM vehicle management server generates information on the PM vehicle demand for the first area 200 according to time by measuring the time the PM vehicle enters or leaves the first area 200. In this case, the PM vehicle management server may consider the time the PM vehicle stays in the first area 200. In addition, the demand information may be updated according to the change in the position of the PM vehicle or a period. In FIG. 2A, the PM vehicle demand amount in the first area 200 according to the demand information and the current time is six units. Further, the PM vehicle demand amount in the second area 210 is two units.

The PM vehicle management server generates the current distribution information by checking the current distribution quantity of the PM vehicle positioned in the first area 200. In FIG. 2A, the PM vehicle demand amount in the first area 200 according to the demand information is two units. Further, the current PM vehicle quantity in the second area 210 is three units.

The PM vehicle management server generates target distribution information based on excess information or shortage information of PM vehicles depending on a difference between the demand information and the current distribution information for the plurality of areas. In FIG. 2A, the target distribution information for the first area 200 and the PM vehicle target quantity according to the current time are four units. The target quantity for the second area is −1 unit.

The PM vehicle management server redistributes PM vehicles based on the target distribution information. The PM vehicle management server moves the PM vehicle from an area in which a first PM vehicle quantity is greater than a first target distribution quantity to an area in which a second PM vehicle quantity is less than a second target distribution quantity based on the excess information or the shortage information of the PM vehicle. For example, the PM vehicle management server moves one excess PM vehicle in the second area 210 to the first area 200 which is four PM vehicles short.

Referring to FIG. 2B, the plurality of areas 200, 210, and 220, a bus stop 302, and subway stations 300, 310, and 320 are illustrated.

The PM vehicle management server according to the embodiment of the present disclosure may collect information about people approaching from a public transportation server to locations adjacent to a plurality of areas. For example, the PM vehicle management server may collect the number of people in the bus approaching the bus stop 302 from the public transportation server. In addition, the PM vehicle management server may collect information about a floating population of the subway stations 300, 310, and 320 from the public transportation server.

When the number of people approaching the area 200 is larger than that approaching the second area 210, the PM vehicle management server may adjust the weight upward by applying a weight to the target quantity in the first area 200. For example, the PM vehicle management server may adjust the PM vehicle target quantity for the first area 200 from 4 units to 6 units.

The PM vehicle management server according to another embodiment of the present disclosure may collect event-related information including a date and time, a location, and the number of visitors of an event on the network.

The PM vehicle management server may apply a weight to target distribution information for an area closer than a preset distance from an event location among the plurality of areas, thereby adjusting the target distribution information. When events, such as performances or ceremonies, are scheduled at locations adjacent to the second area 210, the PM vehicle management server may adjust the target quantity by applying a weight to the target quantity in the second area 210. For example, −1 unit, which is the PM vehicle target quantity for the second area 210, is adjusted to one unit.

In addition, the PM vehicle management server may differentially adjust the target distribution information depending on the distance from the event location. For example, −1 unit, which is the PM vehicle target number for the second area 210, is adjusted to one unit, and the PM vehicle target quantity for the first area 200 is adjusted from 4 units to 5 units.

The PM vehicle management server according to another embodiment of the present disclosure may apply a weight to the PM vehicle target quantity as an age having the highest PM vehicle usage rate becomes lower based on the PM vehicle usage record of the user and the age information of the user for the plurality of areas, thereby adjusting the target distribution information. For example, when an age group that uses PM vehicles the most in the first area 200 is 20 s and an age group that uses PM vehicles the most in the second area 210 is people in their 30 s, the PM vehicle management server may adjust the PM vehicle target quantity in the first area 200 upward.

Figure 3:
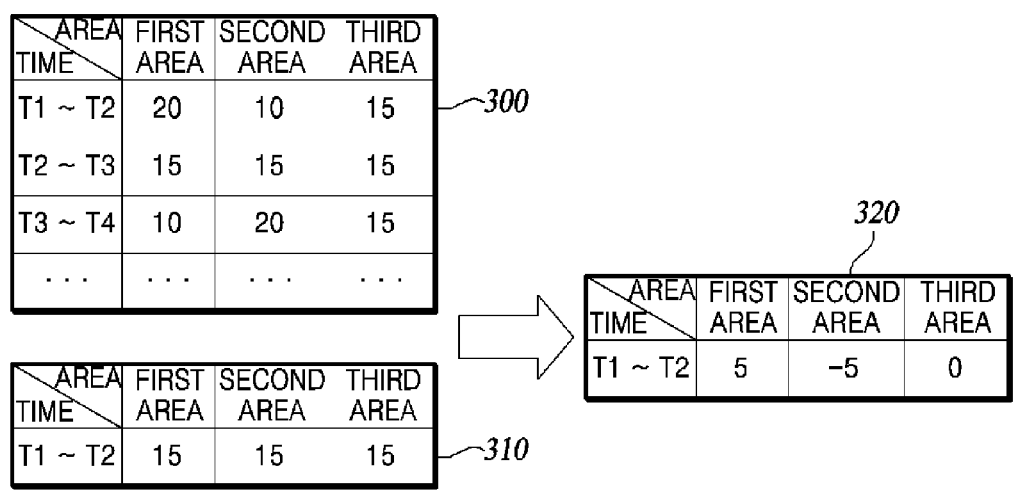
FIG. 3 is a diagram for describing an operation of generating target distribution information according to an embodiment of the present disclosure.

FIG. 3 is a diagram for describing an operation of generating target distribution information according to an embodiment of the present disclosure.

Referring to FIG. 3, the demand information 300, the current distribution information 310, and the target distribution information 320 are illustrated.

The demand information 300 indicates a PM vehicle demand amount for each area according to time. The current distribution information 310 indicates a PM vehicle distribution amount for each area according to a specific time. The target distribution information 320 indicates a PM vehicle target quantity for each area according to a specific time.

The PM vehicle management server may generate the PM vehicle demand information 300 according to time for a plurality of areas based on the change in the position of the PM vehicle and the time of the change in the position of the PM vehicle. The demand information includes a PM vehicle demand amount according to at least one of a minute, an hour, a day, and a month. In addition, the demand information may be updated according to the change in the position of the PM vehicle or a regular period.

The PM vehicle management server may generate the current distribution information 310 for a plurality of PM vehicles positioned in a plurality of areas. The current distribution information 310 indicates the quantity of PM vehicles for each area in section T1 to T2. In the current distribution information 310, a time may be a time point or a section.

The PM vehicle management server may generate the target distribution information 320 for the current time depending on a difference between the demand information 300 and the current distribution information 310 according to the current time. For example, when in the section T1 to T2 that is the current time, the current distribution quantities of PM vehicles in the first area, the second area, and the third area are 15, 15, and 15, respectively, and the PM vehicle demand amount according to the demand information 300 is 20, 10, and 15, respectively, the PM vehicle target quantities for the three areas are 5, −5, and 0.

The PM vehicle management server may move five PM vehicles in the second area to the first area based on the target distribution information 320.

By properly arranging the PM vehicles in an area with a large floating population through the above process, it is possible to reduce the inconvenience of users having to go to an area with a small floating population in order to use the PM vehicle sharing service. In addition, it is possible to appropriately cope with the sudden increase in PM vehicle usage by increasing the number of PM vehicles by determining signs of sudden increase in PM vehicle users due to festivals or ceremonies.

Figure 4A:
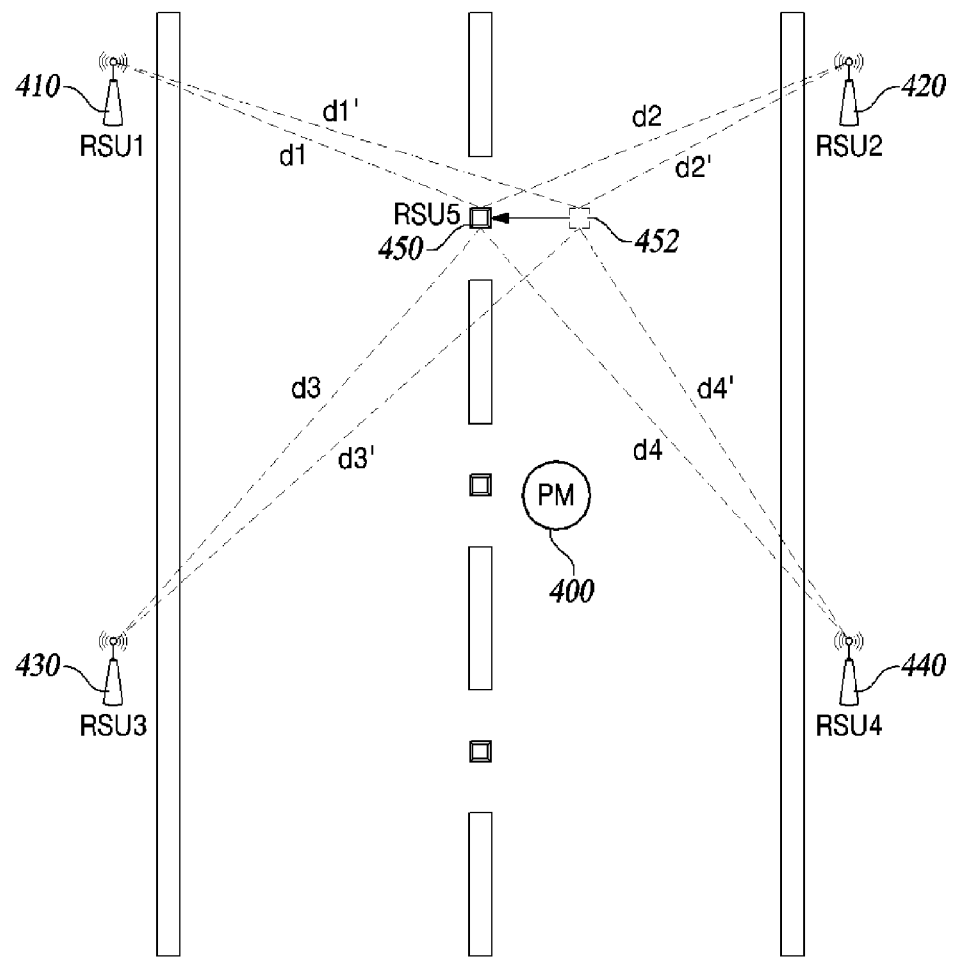
FIGS. 4A and 4B are diagrams for describing an operation of estimating an accurate position of a PM vehicle according to an embodiment of the present disclosure.
Figure 4B:
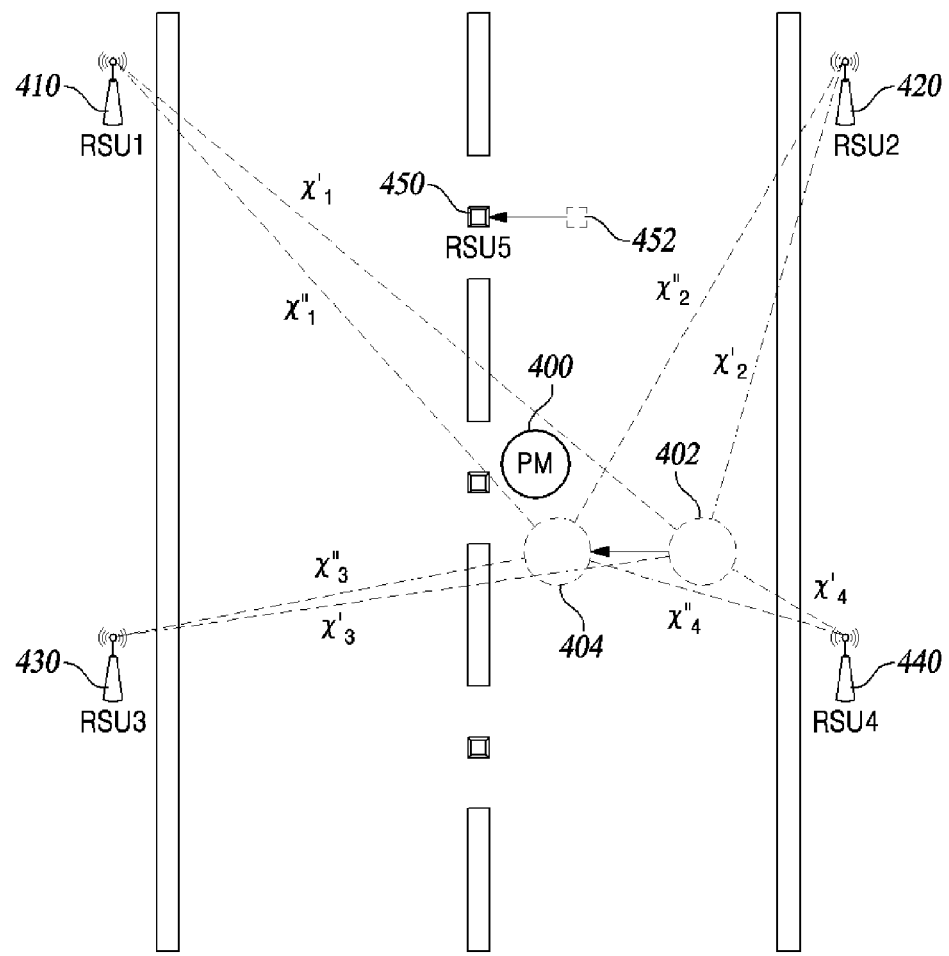

FIGS. 4A and 4B are exemplary diagrams for describing a process of estimating an accurate position of a PM vehicle according to an embodiment of the present disclosure.

In detail, FIG. 4A is a diagram for describing a process of generating correction data. FIG. 4B is a diagram for describing a process of correcting the candidate position of the PM vehicle based on the correction data.

Referring to FIG. 4A, an actual position 400 of a PM vehicle, a plurality of RSUs 410, 420, 430, 440, and 450, and an estimated position 452 of a fifth RSU are illustrated. The plurality of RSUs 410, 420, 430, 440, and 450 include the auxiliary RSUs 410, 420, 430, and 440 and the fifth RSU 450. The auxiliary RSUs 410, 420, 430, and 440 include the first RSU 410, the second RSU 420, the third RSU 430, and the fourth RSU 440. FIG. 4B additionally illustrates an estimated position 402 of the PM vehicle and a corrected position 404 of the PM vehicle.

Hereinafter, the fifth RSU 450 is described as a reference RSU for correction of the estimated position, but this is only one embodiment, and the reference RSU may be implemented by at least one of the first RSU 410, the second RSU 420, the third RSU 430, or the fourth RSU 440. Meanwhile, the auxiliary RSUs 410, 420, 430, and 440 are only an embodiment and may be constituted as at least three of the auxiliary RSUs. Position coordinates for the plurality of RSUs 410, 420, 430, 440, and 450 are assumed to be known in advance.

Hereinafter, it will be described that the PM vehicle management server generates correction data. However, the correction data can be generated by another device or the reference RSU. At this time, the reference RSU may be set to store and transmit the correction data.

The fifth RSU 450 receives messages from the auxiliary RSUs 410, 420, 430, and 440. The PM vehicle management server calculates the distances between the fifth RSU 450 and the auxiliary RSUs 410, 420, 430, 440 based on at least one of the RSSI and the ToF of the messages received by the fifth RSU 450, and the positions of the auxiliary RSUs 410, 420, 430, and 440. At this time, the known positions of the auxiliary RSUs 410, 420, 430, and 440 are utilized.

Based on the distances between the fifth RSU 450 and the auxiliary RSUs 410, 420, 430, and 440, the PM vehicle management server may derive the estimated position 452 of the fifth RSU.

However, the actual position and the estimated position 452 of the fifth RSU may not match due to a signal distortion due to weather or obstacles, errors in the RSU, and the like. By obtaining, however, an error between the known actual position and the estimated position 452 of the fifth RSU and using the previously obtained error as the positioning correction data of the PM vehicle, the PM vehicle management server can accurately derive the actual position 400 of the PM vehicle.

In particular, the PM vehicle management server may accurately derive the actual position 400 of the PM vehicle using correction data including any one of a distance error ratio, a distance error, and a position error of the fifth RSU 450.

Hereinafter, a process of generating correction data in the order of a distance error ratio, a distance error, and a position error, and correcting the position of the PM vehicle using the correction data will be described.

As a first embodiment, in order to use the distance error ratio, the PM vehicle management server calculates a distance $d_1'$ between the estimated position 452 of the fifth RSU and the first RSU 410 based on at least one of the RSSI or the ToF of the messages received by the fifth RSU 450. The PM vehicle management server further calculates a distance $d_1$ between the actual position of the fifth RSU 450 and the first RSU 410.

The PM vehicle management server calculates an error ratio (hereinafter, a first distance error ratio) between $d_1$ and $d_1'$. Here, the distance error ratio means the ratio of the actual distance to the estimated distance. For example, the first distance error ratio means a ratio of $d_1$ to $d_1'$. Additionally, the PM vehicle management server calculates each of a second distance error ratio, a third distance error ratio, and a fourth distance error ratio for the second RSU 420, the third RSU 430, and the fourth RSU 440, respectively.

Referring to FIG. 4B, the PM vehicle management server may derive the corrected position 404 of the PM vehicle by correcting the estimated position 402 of the PM vehicle using the distance error ratio.

Specifically, the PM vehicle receives messages from the auxiliary RSUs 410, 420, 430, and 440. The PM vehicle management server may estimate the estimated position 402 of the PM vehicle based on at least one of the RSSI and the ToF of the messages received by the PM vehicle. In detail, the PM vehicle management server calculates the estimated position 402 of the PM vehicle through the triangulation or the trilateration based on at least three positions of the auxiliary RSUs 410, 420, 430, and 440, and the RSSI or the ToF of the messages received from three RSUs.

The PM vehicle management server obtains the distances between the estimated position 402 of the PM vehicle and the auxiliary RSUs 410, 420, 430, and 440. The distances from the estimated position 402 of the PM vehicle to the auxiliary RSUs 410, 420, 430, and 440 are x1', x2', x3', and x4', respectively.

Thereafter, the PM vehicle management server may calculate the distance error ratios that are the correction data. The distance error ratios mean distance error ratios from the fifth RSU 450 to the auxiliary RSUs 410, 420, 430, and 440.

The PM vehicle management server may obtain the corrected distances by multiplying the distance error ratio by the distances between the estimated position 402 of the PM vehicle and the auxiliary RSUs 410, 420, 430, and 440. For example, the PM vehicle management server may obtain x1" by multiplying $(d_1/d_1')$ by x1'. Additionally, the PM vehicle management server may further obtain x2", x3", and x4".

The corrected distances from the estimated position 402 of the PM vehicle to the auxiliary RSUs 410, 420, 430, and 440 may be expressed as in Equation 1.

$$x'' = x' \times \frac{d}{d'} \quad \text{Equation 1}$$

In Equation 1, x" denotes the corrected distance from the estimated position 402 of the PM vehicle to the auxiliary RSUs 410, 420, 430, and 440. x' denotes the distance from the estimated position 402 of the PM vehicle to the auxiliary RSUs 410, 420, 430, and 440. d denotes the distance from the actual position of the fifth RSU 450 to the auxiliary RSUs 410, 420, 430, and 440. d' denotes the distance from the estimated position 452 of the fifth RSU to the auxiliary RSUs 410, 420, 430, and 440.

The PM vehicle management server may calculate the corrected position 404 of the PM vehicle through the triangulation or the trilateration based on at least three of x1", x2", x3", and x4". Since the error between the actual distance and the estimated distance from the fifth RSU 450 to the auxiliary RSUs 410, 420, 430, and 440 is reflected in the estimated position 402 of the PM vehicle, the corrected position 404 of the PM vehicle is derived to be closer to the actual position 400 of the PM vehicle than the estimated position 402 of the PM vehicle.

The PM vehicle management server according to the embodiment of the present disclosure may correct the estimated position 402 of the PM vehicle using the error ratio for one of the RSSI or the ToF instead of the distance.

As a second embodiment, the PM vehicle management server may calculate the distance errors as the correction data. The distance errors mean distance errors between the fifth RSU 450 and the auxiliary RSUs 410, 420, 430, and 440.

In order to use the distance error, the PM vehicle management server calculates an error (hereinafter, a first distance error) between $d_1$ and $d_1'$. Specifically, the first distance error means a value obtained by subtracting $d_1'$ from $d_1$. Additionally, the PM vehicle management server calculates each of the second distance error, the third distance error, and the fourth distance error for the second RSU 420, the third RSU 430, and the fourth RSU 440.

Referring to FIG. 4B, the PM vehicle management server may derive the corrected position 404 of the PM vehicle by correcting the estimated position 402 of the PM vehicle using the distance error.

Specifically, the PM vehicle receives messages from the auxiliary RSUs 410, 420, 430, and 440. The PM vehicle management server may estimate the estimated position 402 of the PM vehicle based on at least one of the RSSI and the ToF of the messages by the PM vehicle. In detail, the PM vehicle management server calculates the estimated position 402 of the PM vehicle through the triangulation or trilateration based on at least three positions of the auxiliary RSUs 410, 420, 430, and 440, and the RSSI or the ToF of the messages received from three RSUs. In this case, the distances between the estimated position 402 of the PM vehicle and the auxiliary RSUs 410, 420, 430, and 440 are x1', x2', x3', and x4', respectively.

The PM vehicle management server may obtain the respective corrected distances by adding the distance error to the distances from the estimated position 402 of the PM vehicle to the auxiliary RSUs 410, 420, 430, and 440. For example, the PM vehicle management server may obtain x1" by adding $(d_1-d_1')$ to x1'. Additionally, the PM vehicle management server may further obtain x2", x3", and x4".

The distances from the estimated position 402 of the PM vehicle to the auxiliary RSUs 410, 420, 430, and 440 may be expressed as in Equation 2.

$$x''=x'+(d-d') \qquad \text{Equation 2}$$

The PM vehicle management server may calculate the corrected position 404 of the PM vehicle through the triangulation or trilateration based on at least three of x1", x2", x3", and x4". Since the error between the actual distance and the estimated distance from the fifth RSU 450 to the auxiliary RSUs 410, 420, 430, and 440 is reflected in the estimated position 402 of the PM vehicle, the corrected position 404 of the PM vehicle may be closer to the actual position 400 of the PM vehicle than the estimated position 402 of the PM vehicle.

The PM vehicle management server according to the embodiment of the present disclosure may correct the estimated position 402 of the PM vehicle using the error ratio for one of the RSSI or the ToF instead of the distance.

As a third embodiment, the PM vehicle management server may calculate the position errors as the correction data. The position error means a difference between the estimated position 452 and the actual position of the fifth RSU 450. Otherwise, the PM vehicle management server calculates a position error meaning the difference between the actual position of the fifth RSU 450 and the estimated position 452 of the fifth RSU. Here, the position may mean two-dimensional position coordinates or three-dimensional position coordinates. The position error is calculated by calculations for each dimension.

After estimating the estimated position 402 of the PM vehicle, the PM vehicle management server may derive the corrected position 404 of the PM vehicle by correcting the estimated position 402 of the PM vehicle based on the position error for the fifth RSU 450. Specifically, each of the corrections may be performed by dividing the estimated position 402 of the PM vehicle into an x coordinate and a y coordinate.

Meanwhile, the PM vehicle management server may receive the distance error ratio, the distance error, and the position error between the fifth RSU 450 and the auxiliary RSUs 410, 420, 430, and 440 in real time or may calculate and store, in advance, the distance error ratio, the distance error, and the position error.

Through the above-described three error corrections, the PM vehicle management server may derive the accurate position of the PM vehicle.

Figure 5:
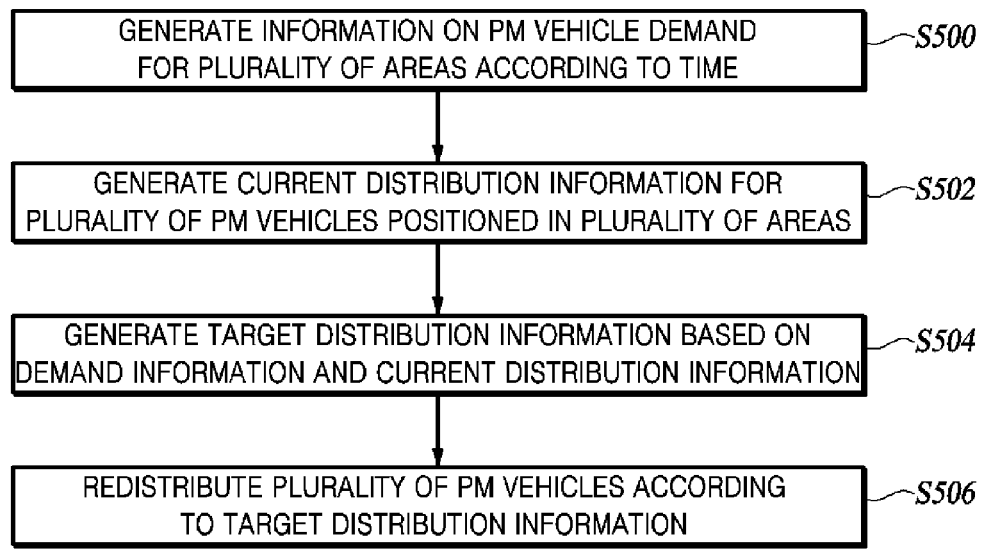
FIG. 5 is a flowchart for describing a method of operating a PM vehicle management server according to an embodiment of the present disclosure.

FIG. 5 is a flowchart for describing a method of operating a PM vehicle management server according to an embodiment of the present disclosure.

The PM vehicle management server generates PM vehicle demand information for a plurality of areas according to time (S500). The PM vehicle management server measures the change in the positions of the PM vehicles and the time of the change in the positions of the PM vehicles for the plurality of areas and generates demand information for the plurality of areas according to at least one of a minute, an hour, a day, and a month.

The PM vehicle management server generates the current distribution information for the plurality of PM vehicles positioned in the plurality of areas (S502).

Specifically, the PM vehicle management server receives, from the plurality of PM vehicles, the messages that the plurality of PM vehicles receive from the plurality of RSUs. The PM vehicle management server estimates positions of a plurality of PM vehicles based on the messages and the position coordinates pre-stored for the plurality of RSUs and generates current distribution information for the plurality of PM vehicles in the plurality of areas based on the positions of the plurality of PM vehicles.

The PM vehicle management server generates target distribution information based on the demand information and the current distribution information (S504). The PM vehicle management server generates target distribution information including excess information or shortage information of PM vehicles depending on a difference between the demand information and the current distribution information for the plurality of areas.

The PM vehicle management server redistributes the plurality of PM vehicles based on the target distribution information (S506).

The PM vehicle management server moves the PM vehicle from an area in which a first PM vehicle quantity is greater than a first target distribution quantity to an area in which a second PM vehicle quantity is less than a second target distribution quantity based on the excess information or the shortage information of the PM vehicle.

Although it is described in FIG. 5 that operations S500 to S506 are sequentially executed, this is merely illustrative of the technical idea of an embodiment of the present disclosure. In other words, those of ordinary skill in the technical field to which an embodiment of the present disclosure belongs may change the order described in FIG. 5 within a range that does not deviate from the essential characteristics of an embodiment of the present disclosure, or will be able to apply various modifications and variations to executing one or more of the operations S500 to S506 in parallel, and therefore, FIG. 5 is not limited to a time-series order.

Meanwhile, the operations illustrated in FIG. 5 can be implemented as computer-readable codes on a computer-readable recording medium. The computer readable recording medium may include all kinds of recording apparatuses in which data that may be read by a computer system is stored. That is, the computer-readable recording medium may be a non-transitory medium such as a read-only memory (ROM), a random-access memory (RAM), a compact disc (CD)-ROM, a magnetic tape, a floppy disk, and an optical data storage device and may further include a transitory medium such as a carrier wave (for example, transmission over the Internet) and a data transmission medium. In addition, the computer readable recording media may be distributed in computer systems connected to each other through a network such that the computer readable codes may be stored and executed in the computer readable recording media in a distributed scheme.

In addition, components of the present disclosure may use an integrated circuit structure such as a memory, a processor, a logic circuit, a look-up table, and the like. These integrated circuit structures execute each of the functions described herein through the control of one or more microprocessors or other control devices. In addition, components of the present disclosure may be specifically implemented by a program or a portion of a code that includes one or more executable instructions for performing a specific logical function and is executed by one or more microprocessors or other control devices. In addition, components of the present disclosure may include or be implemented as a Central Processing Unit (CPU), a microprocessor, etc. that perform respective functions. In addition, components of the present disclosure may store instructions executed by one or more processors in one or more memories.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

As described above, according to an embodiment of the present disclosure, a method of operating an apparatus for predicting and redistributing a shared personal mobility vehicle demand can increase convenience of a user using a PM vehicle sharing service by analyzing a usage pattern of the user for PM vehicles arranged in a plurality of areas to predict the demand amount of the PM vehicles for each area and time and redistributing the PM vehicles depending on the predicted demand amount.

According to another embodiment of the present disclosure, a method of operating an apparatus for predicting and redistributing a shared personal mobility vehicle demand can prevent the PM vehicle bias phenomenon for each area and time by analyzing the usage pattern of the PM vehicle user in various ways and predicting the PM vehicle demand.

According to another embodiment of the present disclosure, a method of operating an apparatus for predicting and redistributing a shared personal mobility vehicle demand can accurately predict and redistribute a PM vehicle demand by identifying an accurate position of a PM vehicle through a plurality of RSUs and communication even in a global navigation satellite system (GNSS) dead-zone or an area where diffuse reflection of a satellite signal is severe.

What is claimed is:

1. A method of operating an apparatus for predicting and redistributing personal mobility vehicle (PM vehicle) demand for shared PM vehicles, the method comprising:
generating demand information for PM vehicles for a plurality of areas according to time;
generating current distribution information for the PM vehicles positioned in the plurality of areas;
generating target distribution information based on the demand information and the current distribution information;
collecting a PM vehicle usage record of a user and age information of the user for the plurality of areas;
calculating a PM vehicle usage rate for each age group of users for each area based on the PM vehicle usage record and the age information;
adjusting the target distribution information based on the PM vehicle usage rate for each age group of the users for each area; and
redistributing the PM vehicles according to the target distribution information by controlling the PM vehicles using an autonomous driving function of the PM vehicles.

2. The method of claim 1, wherein generating the demand information for the PM vehicles comprises:
measuring a change in position of the PM vehicles and a time of the change in the position of the PM vehicles for the plurality of areas; and
generating the demand information for the plurality of areas according to at least one of a minute, an hour, a day, and a month based on the change in the position of the PM vehicles and the time of the change in the position of the PM vehicles.

3. The method of claim 1, wherein generating the current distribution information comprises:

receiving, from the PM vehicles, messages that the PM vehicles receive from a plurality of road side units (RSUs);
estimating positions of the PM vehicles based on the messages and position coordinates pre-stored for the plurality of RSUs; and
generating the current distribution information for the PM vehicles in the plurality of areas based on the positions of the PM vehicles.

4. The method of claim 1, wherein the target distribution information includes excess information or shortage information of the PM vehicles depending on a difference between the demand information and the current distribution information for the plurality of areas.

5. The method of claim 4, wherein redistributing the PM vehicles includes moving the PM vehicles from an area in which a first PM vehicle quantity is greater than a first target distribution quantity to an area in which a second PM vehicle quantity is less than a second target distribution quantity based on the excess information or the shortage information of the PM vehicles.

6. The method of claim 1, further comprising:
collecting information about people approaching a location adjacent to the plurality of areas from a public transportation server; and
adjusting the target distribution information by applying a weight according to the information about the people to the target distribution information for the plurality of areas.

7. The method of claim 1, further comprising:
collecting event-related information including an event date and time, an event location, and a number of visitors to an event on a network;
selecting an area closer than a preset distance from the event location among the plurality of areas; and
adjusting the target distribution information by applying a weight to the target distribution information for the selected area.

8. The method of claim 1, wherein generating the current distribution information comprises:
receiving RF signals from RF readers, when the RF readers positioned in the plurality of areas read the RF signals of radio frequency identification (RFID) tags mounted on the PM vehicles;
estimating positions of the RF readers as positions of the PM vehicles based on the RF signals;
receiving global navigation satellite system (GNSS) signals received by the PM vehicles from the PM vehicles;
estimating the positions of the PM vehicles based on the GNSS signals; and
generating the current distribution information for the plurality of areas based on the positions of the PM vehicles.

9. An apparatus for predicting and redistributing a personal mobility vehicle (PM vehicle) demand for shared PM vehicles, the apparatus comprising:
at least one memory storing instructions; and
at least one processor, wherein the at least one processor is configured to execute the instructions to:
generate demand information for the PM vehicles for a plurality of areas according to time;
generate current distribution information for the PM vehicles positioned in the plurality of areas;
generate target distribution information based on the demand information and the current distribution information;

collect a PM vehicle usage record of a user and age information of the user for the plurality of areas;
calculate a PM vehicle usage rate for each age group of users for each area based on the PM vehicle usage record and the age information;
adjust the target distribution information based on the PM vehicle usage rate for each age group of the users for each area; and
cause the PM vehicles to be redistributed according to the target distribution information by controlling the PM vehicles using an autonomous driving function of the PM vehicles.

10. The apparatus of claim 9, wherein the at least one processor is configured to execute the instructions to:
measure a change in position of the PM vehicles and a time of the change in the position of the PM vehicles for the plurality of areas; and
generate the demand information for the plurality of areas according to at least one of a minute, an hour, a day, and a month based on the change in the position of the PM vehicles and the time of the change in the position of the PM vehicles.

11. The apparatus of claim 9, wherein the at least one processor is configured to execute the instructions to:
receive, from the PM vehicles, messages that the PM vehicles receive from a plurality of road side units (RSUs); and
estimate positions of the PM vehicles based on the messages and position coordinates pre-stored for the plurality of RSUs; and
generate the current distribution information for the PM vehicles in the plurality of areas based on the positions of the PM vehicles.

12. The apparatus of claim 9, wherein the at least one processor is configured to execute the instructions to generate excess information or shortage information of the PM vehicles depending on a difference between the demand information and the current distribution information for the plurality of areas.

13. The apparatus of claim 12, wherein the at least one processor is configured to execute the instructions to move the PM vehicles from an area in which a first PM vehicle quantity is greater than a first target distribution quantity to an area in which a second PM vehicle quantity is less than a second target distribution quantity based on the excess information or the shortage information of the PM vehicles.

14. The apparatus of claim 9, wherein the at least one processor is configured to execute the instructions to:
collect information about people approaching a location adjacent to the plurality of areas from a public transportation server; and
adjust the target distribution information by applying a weight according to the information about the people to the target distribution information for the plurality of areas.

15. The apparatus of claim 9, wherein the at least one processor is configured to execute the instructions to:
collect event-related information including an event date and time, an event location, and a number of visitors to an event on a network;
select an area closer than a preset distance from the event location among the plurality of areas; and
adjust the target distribution information by applying a weight to the target distribution information for the selected area.

16. The apparatus of claim 9, wherein the at least one processor is configured to execute the instructions to:
receive RF signals from RF readers, when the RF readers positioned in the plurality of areas read the RF signals of radio frequency identification (RFID) tags mounted on the PM vehicles;
receive, from the PM vehicles, global navigation satellite system (GNSS) signals received by the PM vehicles;
estimate positions of the RF readers as positions of the PM vehicles based on the RF signals and estimate the positions of the PM vehicles based on the GNSS signals; and
generate the current distribution information for the plurality of areas based on the positions of the PM vehicles.

17. The apparatus of claim 9, the at least one processor is configured to execute the instructions to adjust the target distribution information by increasing a PM vehicle target quantity for the one area when an age group that uses the PM vehicles the most in one area is younger than age groups that use PM vehicles the most in the other areas.

18. A method of operating an apparatus for predicting and redistributing personal mobility vehicle (PM vehicle) demand for shared PM vehicles, the method comprising:
generating demand information for PM vehicles for a plurality of areas according to time;
generating current distribution information for the PM vehicles positioned in the plurality of areas;
generating target distribution information based on the demand information and the current distribution information;
collecting a PM vehicle usage record of a user and age information of the user for the plurality of areas;
calculating a PM vehicle usage rate for each age group of users for each area based on the PM vehicle usage record and the age information;
determining that an age group that uses the PM vehicles the most in one area is younger than age groups that use PM vehicles the most in the other areas;
adjusting the target distribution information based on the PM vehicle usage rate for each age group of the users for each area by increasing a PM vehicle target quantity for the one area; and
redistributing the PM vehicles according to the target distribution information by controlling the PM vehicles using an autonomous driving function of the PM vehicles.

19. The method of claim 18, wherein generating the demand information for the PM vehicles comprises:
measuring a change in position of the PM vehicles and a time of the change in the position of the PM vehicles for the plurality of areas; and
generating the demand information for the plurality of areas according to at least one of a minute, an hour, a day, and a month based on the change in the position of the PM vehicles and the time of the change in the position of the PM vehicles.

20. The method of claim 18, wherein generating the current distribution information comprises:
receiving, from the PM vehicles, messages that the PM vehicles receive from a plurality of road side units (RSUs);
estimating positions of the PM vehicles based on the messages and position coordinates pre-stored for the plurality of RSUs; and
generating the current distribution information for the PM vehicles in the plurality of areas based on the positions of the PM vehicles.

* * * * *